INVENTORS
LAMBERT W. FLECKENSTEIN
ANDREW J. FLECKENSTEIN
BY
ATTORNEYS.

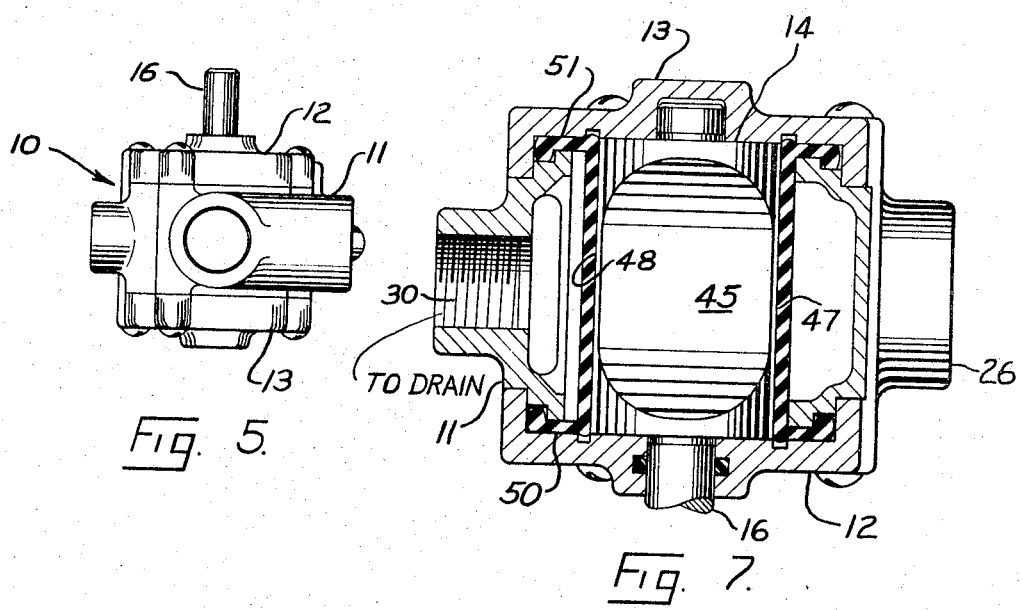
Fig. 5.
Fig. 7.
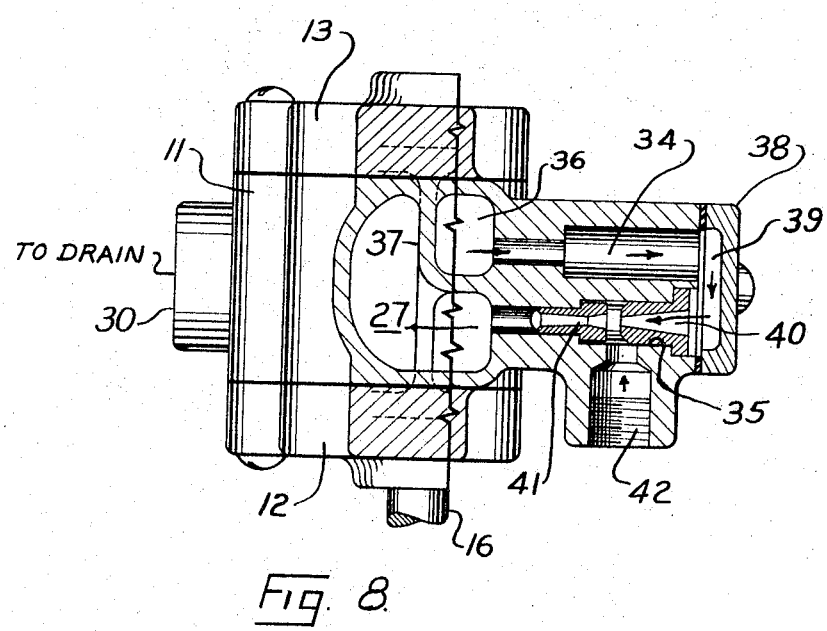
Fig. 8.
INVENTORS
LAMBERT W. FLECKENSTEIN
ANDREW J. FLECKENSTEIN
BY
ATTORNEYS.

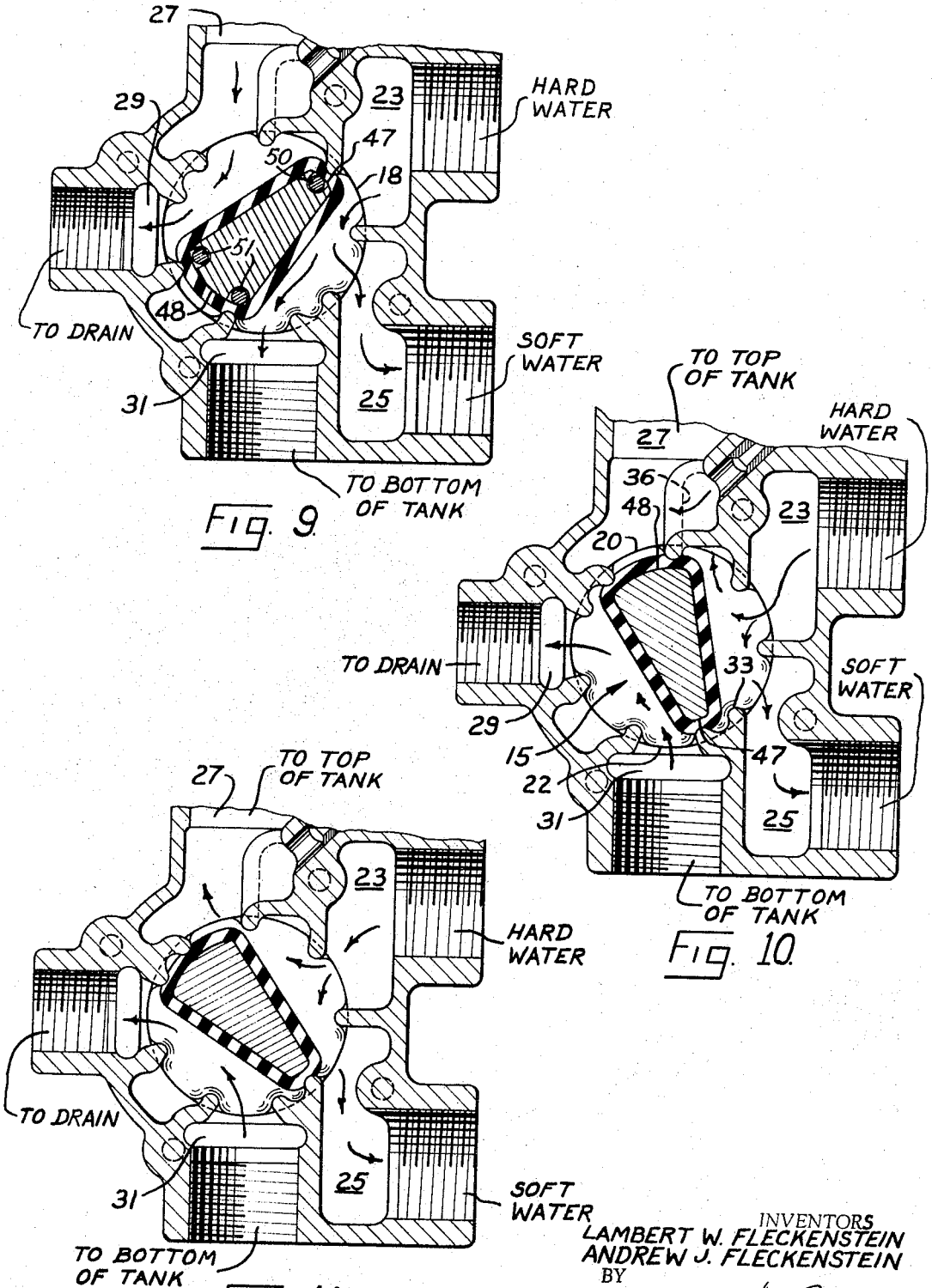

United States Patent Office 3,339,583
Patented Sept. 5, 1967

3,339,583
ROTARY DIAPHRAGM VALVE FOR WATER SOFTENERS
Lambert W. Fleckenstein, 4445 N. 135th, and Andrew J. Fleckenstein, 13650 Squirrel Drive, both of Brookfield, Wis. 53005
Filed Sept. 21, 1964, Ser. No. 397,906
5 Claims. (Cl. 137—625.29)

The present invention is directed to new and useful improvements in rotary control valves which improvements are particularly useful with water softening systems.

The primary purposes of the present invention are to provide a new and novel arrangement of multiported rotary control valves providing for compact assembly and inexpensive manufacture, to provide a valve operating member in a valve operating chamber which is fully enclosed, sealed and protected by a wear and corrosion resistant material, to provide such a valve with facilities for sealing all moving parts of the valve from the fluids passing through the valve, to so arrange a multiport rotary valve and a valve operating member therefor that through rotation of the valve operating member, various and selected ports may be placed in communication with one another while various other ports may be closed off completely from the operating chamber and other ports of the valve, to arrange a rotary valve in such a fashion that small operating forces may be used to control the valve, the valve arrangement being such that the valve may be used to control fluids having solid grits or grains entrained therein without adversely affecting the performance of the valve, these and other purposes being more apparent in the course of the ensuing specification and claims, when taken with the accompanying drawings, in which:

FIGURE 5 is a bottom view of the valve body illustrated in FIGURES 1 and 2;

FIGURE 7 is a sectional view of the valve illustrated in FIGURE 4 and taken on the section line 7—7 of FIGURE 4;

FIGURE 8 is a further sectional view of the valve as illustrated in FIGURE 4 and taken on the section lines 8—8 of FIGURE 4;

FIGURE 9 is a diagrammatic view of the valve illustrating a "backwash" position as used in water softener systems;

FIGURE 10, is a diagrammatic view of the valve illustrating a "brine and rinse" position as used in water softener systems; and FIGURE 11 is a diagrammatic view of the valve illustrating a "rapid rinse" position as used in water softener systems.

Like elements are designated by like characters throughout the specification and drawings.

Figure 1:
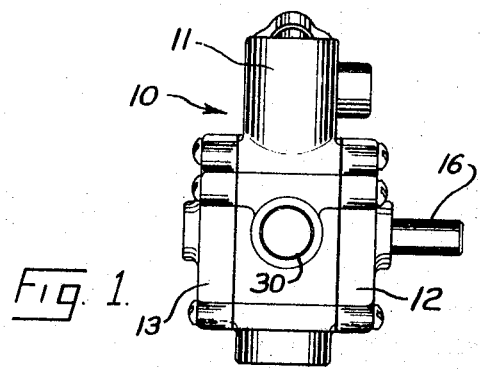
FIGURE 1 is an end view of a valve body incorporating the principles of the present invention.
Figure 2:
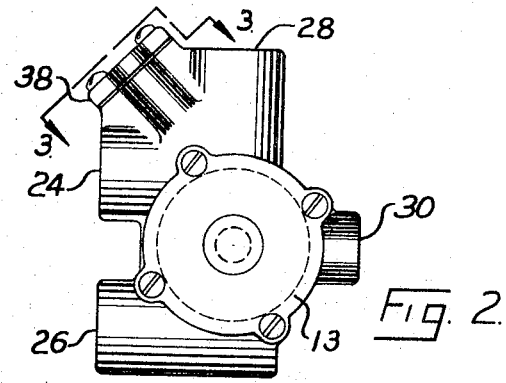
FIGURE 2 is a side view of the valve illustrated in FIGURE 1.

With particular reference now to the drawings and in the first instance to FIGURE 1, 10 generally designates a valve body which may be formed from a molding process and then machined where necessary to provide the valve illustrated. Body 10 may be molded so as to be comprised of a central body section 11 and end cap sections 12 and 13 which are bolted or otherwise affixed to the central section 11. A rotary valve operating member, in the form of a specially shaped spool 14, is positioned within a central chamber 15 in the central body section 11 of the valve body and journalled for rotation therein through use of an operating shaft 16 extending through one end cap 12 and a pilot shaft 17 which is received within the other end cap 13.

The main body section 11 of the valve is formed to provide a plurality of angularly spaced inlet and outlet ports around the axis of the operating member 14. These operating ports are illustrated most clearly in FIGURE 4 and include a hard water inlet port 18 and a service outlet port 19 positioned adjacent thereto. Another port 20 is positioned relatively close or adjacent to the hard water inlet port 18 but spaced on the other side of the hard water inlet port from the service outlet port 19. A drain port 21 is positioned on the other side of the operating chamber 15 from the hard water inlet port 18 and service outlet port 19, and diametrically opposite the area between ports 18 and 19. Another port 22 is positioned between the ports 19 and 20 and relatively adjacent to the port 19.

Port 18 is in communication with a passage 23 formed in the main valve body section, which passage may terminate in a threaded bore 24 for reception of a pipe or conduit fitting of a hard water inlet line. Port 19 is in communication with a passage 15 formed in the main valve body, which passage 25 terminates in a threaded bore 26 which may be connected to a pipe or other conduit fitting leading to a soft water supply line. Port 20 communicates with a passage 27 which is formed in the main valve body, which passage terminates in a threaded bore 28 which may receive a pipe or conduit fitting leading to the top of a conventional water softener tank. Drain port 21 communicates with a passage 29 which is formed through a threaded bore 30 to receive a suitable pipe or conduit for connection to any suitable drain. Port 22 is in communication with a passage 31 in the main valve body and includes a threaded bore 32 for reception of a suitable pipe or conduit fitting leading to the bottom of a softener tank. The several ports 18, 19, 20, 21 and 22 are each formed through lips 33 which project slightly into the valve operating chamber 15 so as to provide valve seats. These lips extend parallel to the axis of rotor 14.

In the arrangement shown, the axes of passages 23, 25 and 29 are parallel to one another and perpendicular to the axes of passages 27 and 31.

Filter and brine delivery pasages are formed in a boss-like section of the main valve body between the hard water inlet passage 23 and the passage 27 leading to the top of the softener tank. These passages are defined through a pair of generally parallel bores 34 and 35 in the boss-like section. Passage 35 extends through the valve body in intersecting relation with passage 27 so as to communicate therewith. Passage 34 communicates with a passage 36 which leads to the operating chamber 15 and communicates therewith at points between the lips 33 defining the hard water inlet port 18 and the port 20 leading to the top of the softener tank. An interior partition 37 in the main valve body defines the passage 36.

The passages 34 and 35 preferably extend angularly with respect to the axes of the hard water passage 23 and outlet passage 29. These passages 34 and 35 may be formed by simply drilling into the boss-like section of the valve body in the location illustrated. After forming these passages, the passages are closed by an end cap 38 which may be bolted or screwed to this boss-like section of the body. End cap 38 includes a passageway 39 to establish communication between the passages 34 and 35.

Passage 34 may include any suitable filter element, the use of which is well known in water softener control valves. Passage 35 includes aspirating elements 40 and 41. A brine tank connecting passage 42 is positioned to communicate with passage 35 between these two aspirating elements 40 and 41. Passage 42 may lead to a conventional brine tank and may have a valve 42a interposed in the line so that communication between the brine tank and the aspirating elements 40 and 41 may be allowed and shut off under selective control as may be provided manually or automatically.

Figure 4:
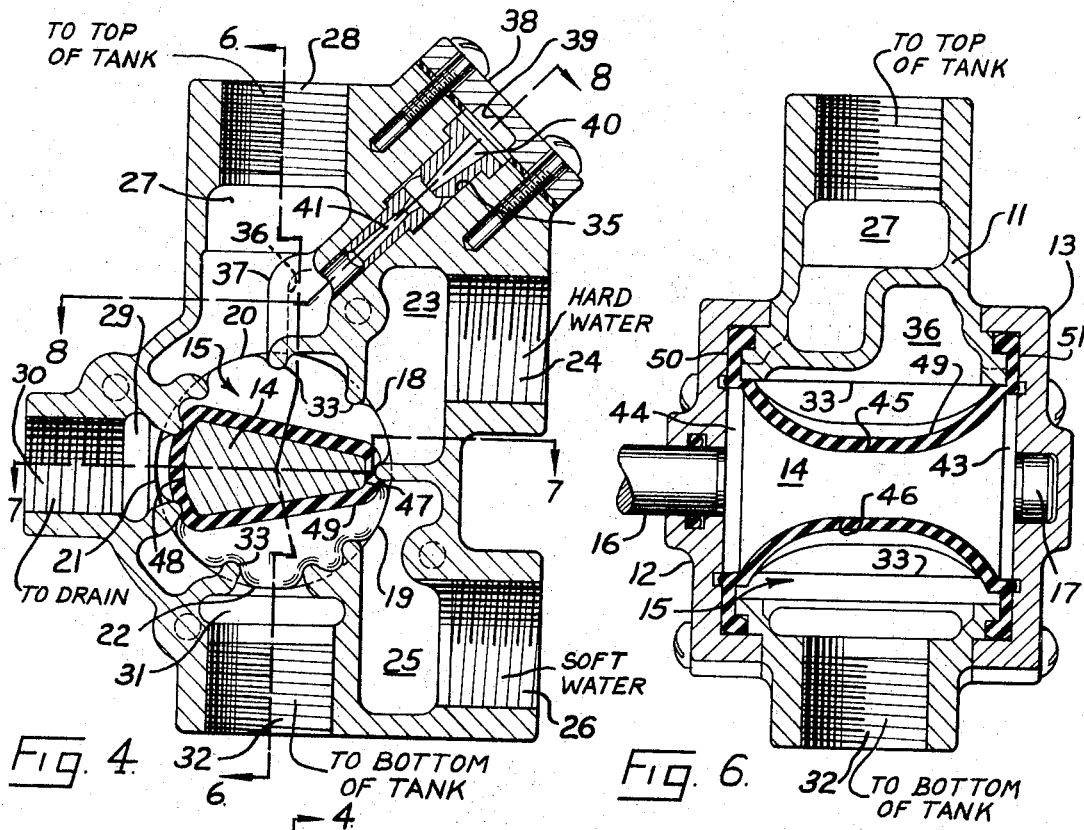
FIGURE 4 is an enlarged sectional view of the valve of FIGURES 1, 2 and 3 and taken on the section lines 4—4 of FIGURE 3 and illustrating a service position of the valve as used for water softening purposes.

In accordance with the principles of the invention, the valve operating member 14 is formed as a specially shaped spool having generally cylindrically formed end portions 43 and 44 while the medial portion of this spool is formed as a reduced section, as may be seen by the cross-sectional illustration in FIGURE 4. Two opposite sides of the valve operating member 14 are hollowed or dished out so as to provide the opposite surfaces 45 and 46 as illustrated. These two diametrically opposite surfaces 45 and 46 may be formed as relatively smooth curves between the cylindrical portions 43 and 44 and looking in a direction transverse to the longitudinal axis of the element, as appears in FIGURE 6. These surfaces 45 and 46 extend between other surfaces 47 and 48 which are diametrically spaced by a distance corresponding generally to the diameter of the cylindrical end portions as appears in FIGURE 7. The surface 47 has a narrower circumferential width than the surface 48. This is seen particularly in FIGURE 4. The surfaces are so formed that the width of the surface 47 is such that it will not span the space or area across the valve seats defined by the lips 33, while the other side 48 has a width such that it will so span the valve seats. This allows one surface of the valve operating member to act merely as a partition in dividing the chamber into several spaces, while another surface of the operating member 14 may act to positively stop all flow from a selected passage to the operating chamber.

Figure 6:
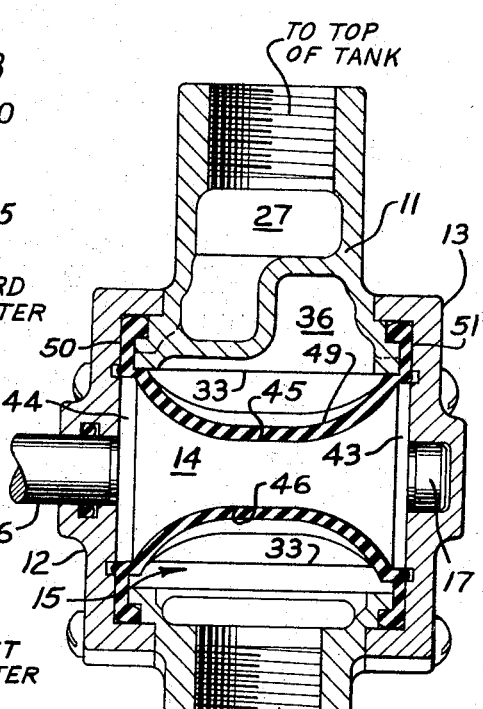
FIGURE 6 is a sectional view of the valve illustrated in FIGURE 4 and taken on the section line 6—6 of FIGURE 4.
Figure 3:
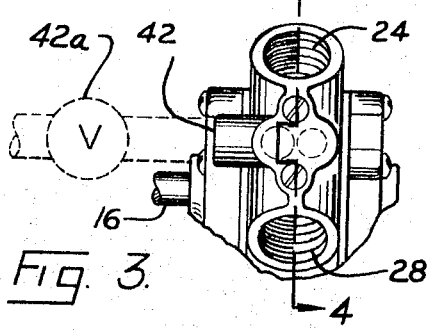
FIGURE 3 is a view of the valve body of FIGURES 1 and 2 and looking in the direction of the arrows 3—3 of FIGURE 2.

The valve operating member 14 is fully enclosed and partitioned off from the operating chamber and the various passages leading thereto by means of a sleeve 49 which is preferably formed of some corrosive resistant and yieldable material such as rubber or rubber compounds. Sleeve 49 is formed to generally match the configuration of the valve operating member 14 and includes cylindrical end portions matching the cylindrical end portions 43 and 44 of the valve operating member 14 and a medial portion which conforms generally to the shape and configuration of the valve operating member, as is seen particularly in FIGURES 4 and 6. As with the case of the valve operating member 14, one dimension, taken transversely of the longitudinal axis of the sleeve, generally matches the diameter of the cylindrical end portions as is seen in FIGURE 7 whereas the other transverse dimensions, as is seen in FIGURES 4 and 6, are of lesser magnitude to generally match the surfaces 45 and 46. Sleeve 49 includes radially extending and circumferentially extending end flanges 50 and 51 which are received in recesses defined between the central body section 11 and the end caps 12 and 13, and clamped therebetween in a sealing relation. The cylindrical ends of the sleeve are held in a stationary position. Thus, the sleeve completely surrounds the moving elements of the valve, while protecting and sealing the same from any corrosive influence within the operating chamber or various passages of the valve.

Sleeve 49 may be deformed as the operating member 14 is rotated, as is seen particularly in FIGURES 9, 10 and 11. The thickness of the sleeve 49 and the dimensions of the operating member 14 are such that the wall of the sleeve is deformed when the sleeve is moved into contact with the valve seats 33 as is seen particularly in FIGURE 4. As valve operating member 14 is rotated, it simply slides across the interior surface of the sleeve so as to cause the sleeve to assume the general cross sectional disposition illustrated in FIGURE 4 in any angular position of the operating member 14.

In use, the various inlets and outlets of the valve are connected to suitable water softening facilities, as for example a conventional regenerative solution or brine tank and to a water softening tank having conventional water softening materials therein. Passage 28 may be connected to the top of the softener tank while passage 31 is connected to the bottom outlet of the softener tank. Passage 23 is connected to the hard water supply line of a home or building, while passage 25 is connected to the service outlet pipes or conduits within the home or building. Passage 29 is connected to a suitable drain pipe while passage 42 is connected to the brine or regenerative solution tank.

In the normal service position of the valve, as illustrated in FIGURE 4, hard water enters through passage 23 and passes through passage 27 into the top of the softener tank. In this position of the valve, the drain port 21 is closed completely to the chamber 15 by surface 48 holding the sleeve tightly against the valve seat around port 21. Softened water is withdrawn from the bottom of the tank through passage 31 whenever a service outlet in the house is open and soft water then passes through the service outlet passage 25 to the service outlet within the home or building. In this normal service position of the valve, communication is closed off to and from the brine tanks through use of some suitable additional valve 42a. Although the hard water inlet passage 23 remains in communication with passage 34, no flow occurs between the passage 34 nad aspirating passage 41 for the reasons that the pressure conditions within passage 27 with which the aspirating passage 41 commuciates is the same as the pressure condition in chamber 36.

When it is desired to regenerate the water softening system, valve member 14 is rotated counterclockwise as appears in FIGURE 4 until the side 48 of the operating member spans the adjacent sides of the ports 21 and 22 while the narrower side 47 moves to the side edge of the hard water inlet passage 18, as in FIGURE 9. In this position of the valve, communication between the passages 23 and 27 is blocked while the hard water passage 23 may communicate directly with the service outlet passage 25 and thus by-pass the softening system to allow normal water service during the regenerative process. In this same position of the valve, hard water flows between passages 23 and 31 to the bottom of the tank for a backwashing operation. In this same position, the top of the softener tank is connected to the drain port so that the backwash water empties from the top of the tank to the drain.

After a suitable period of backwashing time, which may be regulated by clockwork or the like, valve member 14 is then rotated ot a brine and rinse position as in FIGURE 10. In this position of the operating member, the narrower side 47 of the valve operating member contacts that side of the valve seat 33 for the port 22 closest to the service outlet passage 25 while the diametrically opposite and wider portion of the valve operating member is disposed across the seat 33 for port 20 so as to press the sleeve tightly against the seat and completely close port 20 to chamber 15. At this position, hard water may still by-pass the softener system and flow directly to the service outlet 25 as required. In this same position, hard water flows from passage 23, through chamber 36, through filter 34, connecting passage 39 and through aspirating passage 35. Brine valve 42a is opened at this time. It may be opened through suitable means governed by any suitable control means utilized with the valve. Hard water flowing through the aspirating passage 35 creates a suction condition which withdraws the brine or regenerative solution from the brine tank and this regenerative solution passes through the passage 35 to the passage 27 and to the top of the softener tank so as to regenerate the water softening material within the tank. Excess liquid flows from the bottom of the tank through the valve chamber, and to the drain outlet 29. After a suitable quantity of brine has been withdrawn from the brine tank, flow from the brine tank may be discontinued, as may be regulated by conventional float valve or air check valves or other means cooperating with the brine tank, hard water continues flowing through the aspirating passage into the top of the tank so as to rinse the softener tank. Excess liquid continues to be withdrawn from the bottom of the tank and passed to the drain.

Following a predetermined amount of this rinsing action, the valve controlling member may be shifted to a position allowing flow of hard water from the inlet 23 directly to the top of the tank through passage 27 while the bottom of the tank is connected through passage 31 to drain. In this position, as seen in FIGURE 11, hard water also bypasses to the normal service outlet at 25 while the service outlet 25 is closed off from the softener tank as by closure to the passage 31. This may correspond to the rapid rinsing position of the valve, since in this position the flow of hard water to the softener tank is much more rapid than the valve position of FIGURE 10.

After this rinsing or rapid rinsing step, the valve may be shifted back to the normal service position of FIGURE 4. At this time, suitable means, such as are known to the art, may be utilized to refill the brine tank.

It should be noted that through use of the deformable sleeve 49, all moving parts of the valve operating mechanism are shielded from the liquid passing through the various passages in the operating chamber of the valve. This allows the use of relatively cheap or inexpensive metals for the valve member 14 without concern about the corrosive effect thereon. The bearings for the valve member 14 are similarly isolated from the liquid passing through the valve.

The action of the valve member 14 within the protective sleeve may be considered somewhat akin to that of a wiping action on the interior wall of the sleeve. Rotation of the valve member simply forces a different circumferential area of the sleeve to the outwardly expanded position corresponding to the surfaces 47 and 48.

Any particles of grit or small solids which remain in the valve chamber do not adversely affect the valve since they tend to be moved away from the valve seats by the rotating action of the operating member so that they can be flushed away with the fluid passing through the valve.

Rotation of the valve operating member 14 may be accomplished through suitable electrical drive means, such electric motors controlled by clockwork. The valve may be operated by timing mechanisms using springs and the like and hand wound, to shift the valve member 14 to the different angular positions. Rotation of the valve member 14 may also be accomplished completely by hand.

The valve operating member may be provided with rollers positioned within recesses in the valve operating member and with the surfaces of the rollers protruding slightly beyond the surface of the valve operating member and into contact with the interior surface of the flexible sleeve. The surfaces of member 14 between the rollers remain in backup relation to the sleeve as is illustrated in FIGURES 1 through 11. For example, such rollers may be positioned so that one roller 50 is carried at the one narrower side 47 of the valve operating member while two spaced rollers 51 are positioned at the opposite side as is shown in FIGURE 9. The rollers at the opposite side may be spaced apart by an amount approximating the span of the lips defining the valve seats so that when this larger side of the valve operating member is disposed across the valve seat, the two rollers are positioned to press the flexible sleeve against the opposite sides of the valve seat.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A multi-port control valve including a valve body having a valve operating space therein, a plurality of inlet and outlet ports positioned around said space, a rotatable valve operating member in said space, said inlet and outlet ports having valve seats spaced angularly with respect to the axis of said operating member, a sleeve of flexible material surrounding said operating member and fixed against rotation in said space, said operating member together with said sleeve having an effective diameter such as to contact two diametrically opposed ones of said seats, said valve body having at least one additional port opening into said operating space at a point between said opposed seats, one side of said operating member being narrower than the other side, said operating member having generally cylindrical end portions, said sleeve having cylindrical end portions conforming to said end portions of said operating member, said operating member and sleeve having certain diametrical dimensions, taken between said opposite sides, corresponding generally to the diametrical dimensions of said end portions, said operating member and sleeve having other diametrical dimensions, taken between said end portions and transversely of said certain diametrical dimension of lesser extent than said certain diametrical dimensions, said one side having a dimension such as to cause contact between the sleeve and one side of one of said opposed valve seat while the other side of said valve member has a dimension such as to cause said sleeve to span the entire opposed valve seat, whereby rotation of said valve operating member may close off and establish communication between one port and another port through said operating space while at the same time stopping communication between still another port and said operating space.

2. A multi-port control valve including a valve body having a valve operating space therein defined by an interior wall in said valve body, a plurality of inlet and outlet ports positioned around said space, a rotatable valve operating member in said space, said inlet and outlet ports having valve seats spaced angularly with respect to the axis of said operating member, a sleeve of flexible material surrounding said operating member, said operating member together with said sleeve having an effective diameter such as to contact two diametrically opposed ones of said seats, said valve body having at least one additional port opening into said operating space at a point between said opposed seats, one side of said operating member being narrower than the other side, said one side having a dimension such as to cause contact between the sleeve and one side of one of said opposed valve seat while the other side of said valve member has a dimension such as to cause said sleeve to span the entire opposed valve seat, whereby rotation of said valve operating member may close off and establish communication between one port and another port through said operating space while at the same time stopping communication between still another port and said operating space, said ports being formed through valve seats projecting inwardly from said wall whereby portions of said wall between said seats are spaced from said operating member and sleeve, and said sleeve is deformed in the region of said valve seats by pressure of said operating member thereagainst.

3. A multi-port water softening valve including a valve body having an operating chamber therein, said body having a plurality of ports opening into said chamber and spaced at equal radial distances with respect to said chamber, one of said ports being positioned closely adjacent to another port so as to provide hard water inlet and service outlet passages adjacent to one another, others of said ports being connectable to separated inlet and outlet portions of a softener tank and to drain connection, and a rotary valve operating member positioned within and for rotation about a central axis of said chamber, said valve operating member havig radial dimensions such as to span the valve chamber between two opposed ports while serving to partition said hard water inlet port and soft water outlet ports from one another in one position of the valve and while allowing communication between said hard water inlet port and one portion of a softener tank and communication between said service outlet port and another portion of said softener tank, said operating member having a medial portion of tapered form with one side portion of said member of sufficient dimensions to span and close any one of said valve ports while the opposite side portion of said operating member is of smaller dimensions which are insufficient to span and close any one of said valve ports, said valve member having another position connecting said hard water inlet port to said another portion of said softener tank while also connecting the hard water inlet port to said service outlet port to provide backwashing and while connecting said drain connection to said one portion of said softener tank.

4. A multi-port water softening valve including a valve body having an operating chamber therein, said body having a plurality of ports opening into said chamber and spaced at equal radial distances with respect to said chamber, one of said ports being positioned closely adjacent to another port so as to provide hard water inlet and service outlet passages adjacent to one another, others of said ports being connectable to separated inlet and outlet portions of a softener tank and to a drain connection, and a rotary valve operating member positioned within and for rotation about a central axis of said chamber, said valve operating member having radial dimensions such as to span the valve chamber between two opposed ports while serving to partition said hard water inlet port and soft water outlet port from one another in one posiiton of the valve and while allowing comunication between said hard water inlet port and one portion of a softener tank and communication between said service outlet port and another portion of said softener tank, said operating member being defined by a flexible sleeve fixed against rotation in said chamber and an interior rotatable back-up member positioned within said sleeve and shaped to deform said sleeve against said ports, said back-up member having at least one roller carried by and in rolling contact with said sleeve, said valve member having another position connecting said hard water inlet port to said another portion of said softener tank while also connecting the hard water inlet port to said service outlet port to provide backwashing and while connecting said drain connection to said one portion of said softener tank, said ports being defined through valve seats projecting into said chamber whereby said backup member may selectively deform said sleeve against said seats to close said ports.

5. A multi-port water softening valve including a valve body having an operating chamber therein, said body having a plurality of ports opening into said chamber and spaced at equal radial distances with respect to said chamber, one of said ports being positioned closely adjacent to another port so as to provide hard water inlet and service outlet passages adjacent to one another, others of said ports being connectable to separated inlet and outlet portions of a softener tank and to a drain connection, and a rotary valve operating member positioned within and for rotation about a central axis of said chamber, said valve operating member having radial dimensions such as to span the valve chamber between two opposed ports while serving to partition said hard water inlet port and soft water outlet port from one another in one position of the valve and while allowing communication between said hard water inlet port and one portion of a softener tank and communication between said service outlet port and another portion of said softener tank, said ports being defined through valve seats projecting inwardly into said chamber, said valve operating member being defined by a deformable sleeve fixed against rotation in said chamber and an interior rotatable member formed and adapted to press said sleeve against one or more of said seats, said sleeve being deformable against said seats, said valve member having another position connecting said hard water inlet port to said another portion of said softener tank while also connecting the hard water inlet port to said service outlet port to provide backwashing and while connecting said drain connection to said one portion of said softener tank.

References Cited

UNITED STATES PATENTS

| | | | |
|---|---|---|---|
| 2,610,023 | 9/1952 | Whitlock | 137—625.29 |
| 2,948,504 | 8/1960 | Merrill | 251—331 X |
| 2,989,076 | 6/1961 | Rohmann. | |
| 3,165,119 | 1/1965 | Hewitt | 251—331 |
| 3,168,110 | 2/1965 | Reynolds | 137—625.29 X |
| 3,195,573 | 7/1965 | Daumy. | |

FOREIGN PATENTS 904,565 8/1962 Great Britain.

M. CARY NELSON, *Primary Examiner.*

A. ROSENTHAL, *Examiner.*

UNITED STATES PATENT OFFICE
CERTIFICATE OF CORRECTION

Patent No. 3,339,583                                            September 5, 1967

Lambert W. Fleckenstein et al.

It is hereby certified that error appears in the above numbered patent requiring correction and that the said Letters Patent should read as corrected below.

Column 6, line 48, after "member," insert -- and fixed against rotation in said space --; line 70, for "bdoy" read -- body --; column 7, line 2, for "to drain connection" read -- to a drain connection --.

Signed and sealed this 30th day of July 1968.

(SEAL)
Attest:

Edward M. Fletcher, Jr.                                         EDWARD J. BRENNER
Attesting Officer                                                    Commissioner of Patents